Sept. 20, 1927. 1,643,236
J. J. BELL
AUTOMOBILE SEAT
Filed July 26, 1926 2 Sheets-Sheet 2
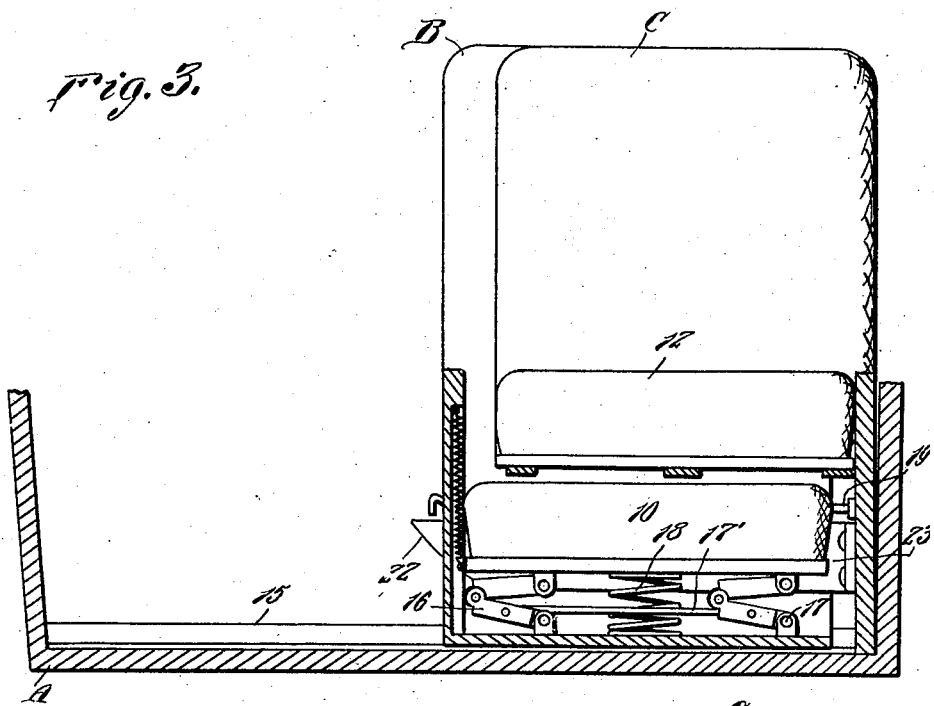
Fig. 3.
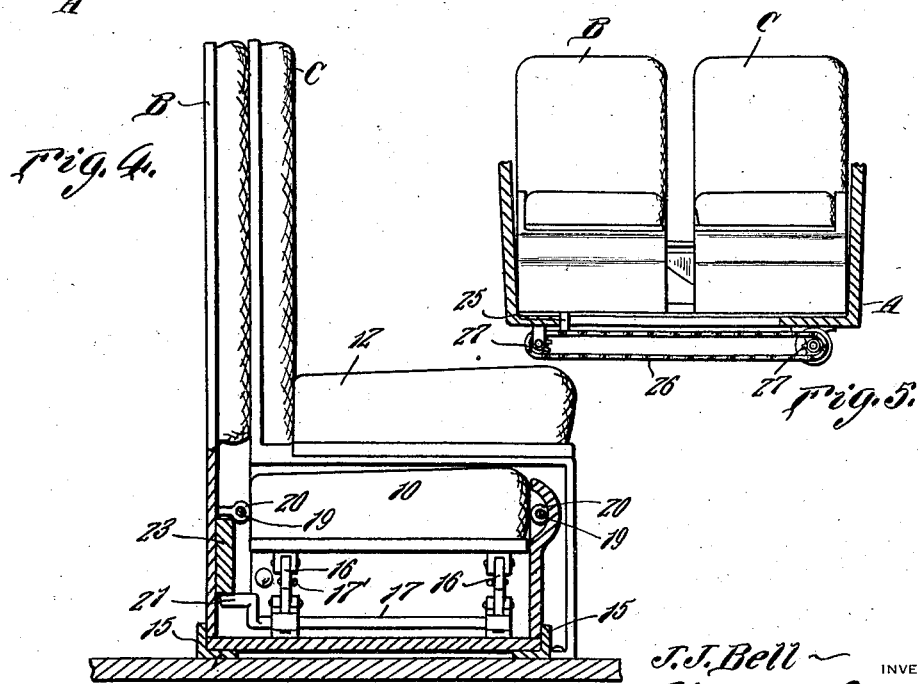
Fig. 4.
Fig. 5.
J. J. Bell, INVENTOR
BY Victor J. Evans
ATTORNEY Patented Sept. 20, 1927.

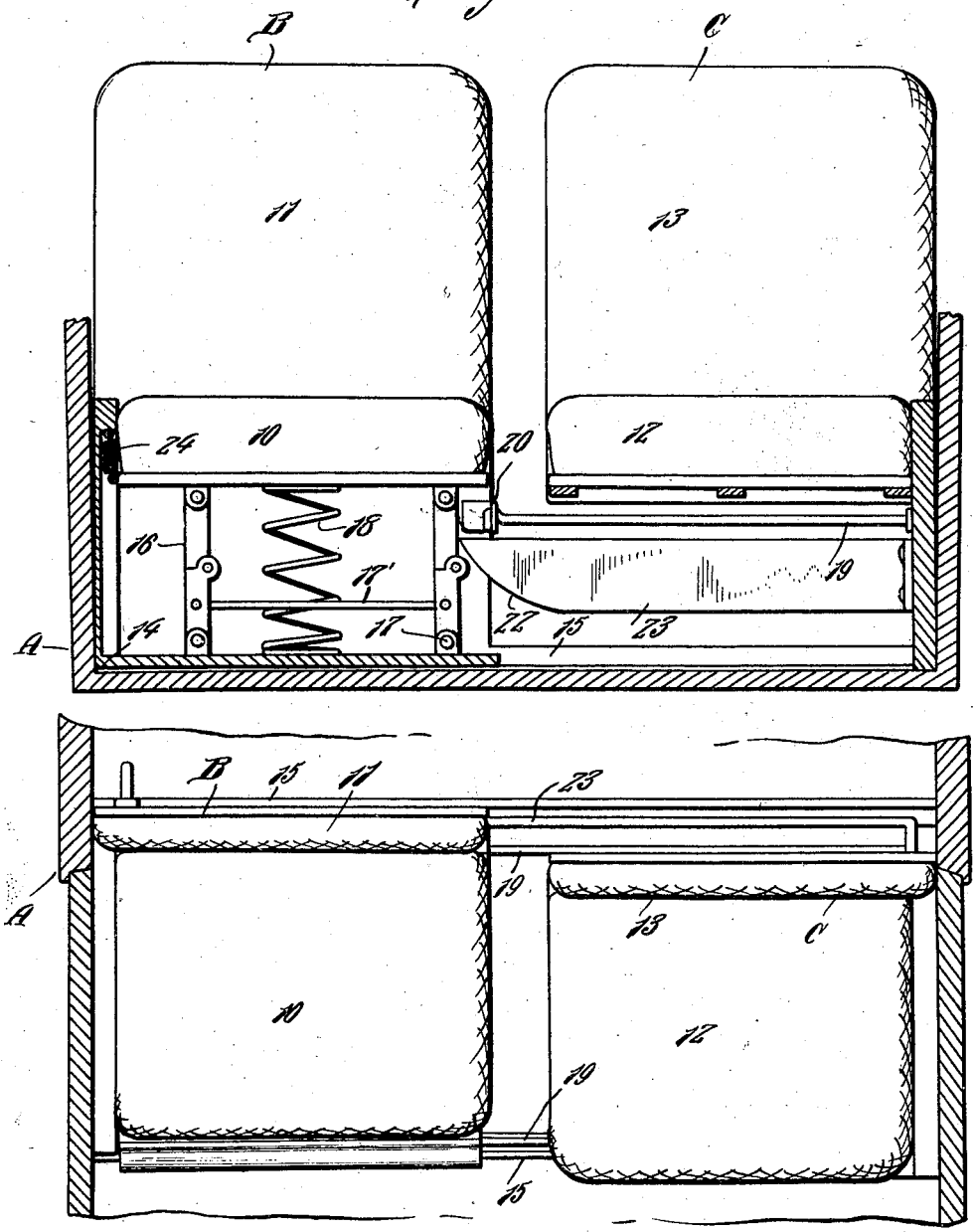

1,643,236

UNITED STATES PATENT OFFICE.

JESSE JAMES BELL, OF TERRE HAUTE, INDIANA.

AUTOMOBILE SEAT.

Application filed July 26, 1926. Serial No. 125,046.

This invention relates to motor operated vehicles, and more particularly to the front seat structure thereof.

In what is known as two door coaches, some difficulty is experienced by persons reaching and leaving the rear seat of the vehicle, and in most instances one of the front seats thereof is mounted to be tilted forwardly to an out of the way position, in order to let a passenger readily enter or leave the car from the rear seat.

It is therefore my purpose to provide a front seat construction, wherein one seat is adapted to slide beneath the other seat with a view of providing more space adjacent the door of the vehicle to allow persons to more readily and conveniently enter or leave the vehicle.

It is therefore my purpose to provide a front seat construction, wherein one seat is adapted to slide beneath the other seat with a view of providing more space adjacent the door of the vehicle to allow persons to more readily and conveniently enter or leave the vehicle.

In carrying out the invention I contemplate the provision of means for supporting the movable seat on the same level with the adjacent stationary seat, together with means for collapsing the supporting means when the movable seat is initially shifted in the direction of the stationary seat, thereby allowing the cushion of the movable seat to be lowered to a point to move beneath the adjacent seat.

Other objects and advantages will appear when the following detail description is read in connection with the accompanying drawings, the invention residing in the construction, combination and arrangement of parts as claimed.

In the drawings forming part of this application like numerals of reference indicate similar parts in the several views and wherein:

Figure 1 is an elevation of the front seat construction partly in section, and showing the normal position of the seats.

Figure 2 is a top plan view.

Figure 3 is a view in elevation and partly in section showing the movable seat arranged beneath the stationary seat.

Figure 4 is a view taken at a right angle to Figure 3 and partly in section.

Figure 5 is a front elevation of a seat construction showing a modified form of the invention.

Referring to the drawings in detail A indicates a portion of the vehicle body upon which are arranged the adjacent seats B and C respectively. These seats are arranged side by side, the former being movable and adapted to be arranged beneath the stationary seat C. The seat proper of the movable seat is indicated at 10 and includes a back 11, while the corresponding parts of the seat C are indicated at 12 and 13 respectively. The frame 14 of the movable seat slides between angle irons 15 clearly shown in Figure 4 and which angle irons constitute tracks and guides for the movable seat. The seat proper 12 of the stationary seat is supported at a suitable elevation to permit the seat proper 10 of the movable seat B to be slid beneath the seat 12, while it will be noted upon inspection of Figure 2 that the back 11 of the movable seat is arranged in a plane slightly in the rear of the back 13 of the adjacent seat, so that when the movable seat is shifted to the position shown in Figure 3, the back 11 will move to a position behind the back 13.

The seat proper 10 of the movable seat is normally supported on the same level with the seat 12, for which purpose I make use of hinged supporting bars 16, these bars being arranged adjacent the corners of the seat and connected in pairs by rods 17, so that all of the supporting bars are collapsed simultaneously in a manner to be presently described. In addition to the bars 16 I also employ a spring 18 which is interposed between the seat 10 and the bottom of the frame therefor, the seat being collapsed under the influence of this spring. Arranged beneath the seat 12 and supported by the frame therefor are spaced guide rods 19 which are received by eyes 20 carried by the frame of the movable seat structure, to assist in steadying and guiding the seat structure B while the latter is being moved toward and away from the stationary seat structure C.

On inspection of Figure 4 it will be noted that one of the rods 17 which connect the bars 16 terminates to provide a crank portion 21 which is arranged to be engaged by the cam-like surface 22 of a stationary arm 23 arranged beneath the seat 12 and secured to the frame thereof. The arm 23 is disposed in the path of movement of the crank portion 21, so that when the movable seat structure is initially moved in the direction of the stationary seat, the bars 16 are simultaneously collapsed, and the seat proper 10 lowered to a level by the spring 18 whereby it can be conveniently moved under the seat 12. During this movement of the seat proper 10, a coil spring 24 connected with said seat and also with the frame 14 thereof is tensioned, so that when the movable seat structure is returned to its normal position, or in other words moved from beneath the stationary seat, the seat proper 10, the spring 24 will assist in returning the seat to its normal position.

Figure 5 shows a modified form of the invention wherein the movable seat B and stationary seat C are of the same construction as hereinabove described, but wherein the movable seat B is connected by a pin 25 to an endless belt 26, the latter being trained over suitable spaced sprockets 27 which may be rotated in any suitable manner with a view of moving the seat structure B toward and away from the stationary seat structure C.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, a stationary seat structure including a back, a movable seat structure including a back arranged to be moved behind the back of the stationary seat, collapsible means for supporting the movable seat at the same level as the stationary seat, means for collapsing said supporting means when the movable structure is initially shifted in the direction of the stationary seat, resilient means for lowerng the movable seat incident to the collapsing of the supporting structure, whereby said movable seat is arranged at a level to pass beneath the stationary seat, and yieldable means assisting in returning the movable seat to its normal level when moved from beneath the stationary seat.

2. In combination, a stationary seat structure including a back, a movable seat structure including a back arranged to be moved behind the back of the stationary seat, collapsible means for supporting the movable seat at the same level of the stationary seat, said means including a retractile spring arranged beneath the movable seat, and means for collapsing said supporting means when the movable structure is initially shifted in the direction of the stationary seat.

3. In combination, a stationary seat structure including a back, a movable seat structure including a back arranged to be moved behind the back of the stationary seat, collapsible means for supporting the movable seat at the same level as the stationary seat, means for collapsing said supporting means when the movable structure is initially shifted in the direction of the stationary seat, eyes carried by the movable seat structure, and a guide rod arranged beneath the stationary seat and received by said eyes for guiding the movable seat laterally.

4. In combination, a stationary seat structure including a back, a movable seat structure including a back arranged to be moved behind the back of the stationary seat, collapsible means for supporting the movable seat at the same level as the stationary seat, said means including hinged supporting bars and a retractile spring secured to the bottom of said movable seat, and means for collapsing said supporting bars when the movable structure is initially shifted in the direction of the stationary seat.

In testimony whereof I affix my signature.

JESSE JAMES BELL.